(12) United States Patent
Ren et al.

(10) Patent No.: US 11,888,309 B2
(45) Date of Patent: Jan. 30, 2024

(54) FAULT HANDLING SYSTEM OF SOLID-STATE TRANSFORMER

(71) Applicant: Huawei Digital Power Technologies Co., Ltd., Shenzhen (CN)

(72) Inventors: Biao Ren, Shenzhen (CN); Xin Liu, Shenzhen (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/950,792

(22) Filed: Sep. 22, 2022

(65) Prior Publication Data

US 2023/0088540 A1 Mar. 23, 2023

(30) Foreign Application Priority Data

Sep. 22, 2021 (CN) .......................... 202111106213.9

(51) Int. Cl.
*H02H 7/04* (2006.01)
*H02H 1/00* (2006.01)

(52) U.S. Cl.
CPC ............ *H02H 7/04* (2013.01); *H02H 1/0007* (2013.01)

(58) Field of Classification Search
CPC ............................... H02H 7/04; H02H 1/0007
See application file for complete search history.

(56) References Cited

U.S. PATENT DOCUMENTS

| | | | |
|---|---|---|---|
| 8,040,648 B2 | 10/2011 | Baudesson | |
| 10,084,393 B2 * | 9/2018 | Xia | .......... H02M 7/49 |
| 11,515,795 B2 * | 11/2022 | Li | .......... H02M 3/155 |
| 2013/0215536 A1 | 8/2013 | Eisenhauer et al. | |
| 2014/0001871 A1 * | 1/2014 | Vogman | .......... H02J 5/00 307/82 |
| 2014/0313789 A1 | 10/2014 | Dujic et al. | |
| 2015/0008748 A1 * | 1/2015 | Deboy | .......... H02M 7/53871 307/77 |
| 2016/0261205 A1 | 9/2016 | Kolar et al. | |

(Continued)

FOREIGN PATENT DOCUMENTS

| | | |
|---|---|---|
| CN | 110912389 A | 3/2020 |
| CN | 111819778 A | 10/2020 |
| CN | 112994410 A | 6/2021 |

(Continued)

*Primary Examiner* — Scott Bauer (74) *Attorney, Agent, or Firm* — Leydig, Voit & Mayer, Ltd.

(57) ABSTRACT

A fault handling system of a solid-state transformer, including a first power unit and a second power unit that are cascaded and connected is provided. The first power unit includes a first auxiliary supply, a first control module, and a first communication module. The first auxiliary supply and the first control module are both electrically connected to two ends of a first busbar capacitor. The first control module is configured to detect a voltage of the first busbar capacitor. The second power unit includes a second auxiliary supply and a second control module. The second auxiliary supply and the second control module are both electrically connected to two ends of a second busbar capacitor. The first communication module outputs fault information to the second control module when the first control module detects that the voltage of the first busbar capacitor is greater than a threshold.

17 Claims, 6 Drawing Sheets

(56) References Cited

U.S. PATENT DOCUMENTS

2018/0212535 A1    7/2018  Xia et al.
2022/0115960 A1*   4/2022  Huang ..................... H02J 7/02

FOREIGN PATENT DOCUMENTS

| CN | 113098273 A | 7/2021 |
| CN | 113972817 A | 1/2022 |
| JP | 2020005429 A | 1/2020 |

* cited by examiner

FAULT HANDLING SYSTEM OF SOLID-STATE TRANSFORMER

CROSS-REFERENCE TO RELATED APPLICATION

This application claims priority to Chinese Patent Application No. 202111106213.9, filed on Sep. 22, 2021, which is hereby incorporated by reference in its entirety.

TECHNICAL FIELD

This application relates to the field of electronic technologies, and in particular, to a fault handling system of a solid-state transformer.

BACKGROUND

As a basic device of a power system, a conventional power transformer cannot implement direct-current voltage transform. In recent years, with the rapid development of electronic technologies, a solid-state transformer has attracted wide attention as a new type of transformer. The solid-state transformer has an advantage of a small volume. In addition, the solid-state transformer can further complete tasks such as power quality management and new energy access, and can serve as a key device for voltage transform and energy management in a direct-current power grid. Therefore, the solid-state transformer has become a current research hotspot.

A medium-voltage auxiliary supply of the solid-state transformer may use a distributed structure. The auxiliary supply obtains power by using a busbar of each cascaded unit. If the auxiliary supply is damaged, a busbar capacitor of the cascaded unit damaged during medium-voltage power-on consumes a very small quantity of charges. Consequently, the busbar capacitor is damaged due to an increase of a busbar voltage of the cascaded unit.

SUMMARY

In view of this, this application provides a fault handling system of a solid-state transformer. When any cascaded power unit is faulty, a normally operating power unit can close an auxiliary supply in the normally operating power unit and reduce a voltage of a busbar capacitor in the faulty power unit, to ensure that the voltage of the busbar capacitor in the faulty unit is within a safe range, thereby avoiding further fault spreading and improving reliability of the system.

According to a first aspect, an embodiment of this application provides a fault handling system of a solid-state transformer, including a first power unit and a second power unit that are cascaded and connected. The first power unit includes a first busbar capacitor, a first auxiliary supply, a first control module, and a first communication module. The first communication module is electrically connected to the first control module. The first auxiliary supply and the first control module are both electrically connected to two ends of the first busbar capacitor. The first control module is electrically connected to the first auxiliary supply. The first control module is configured to detect a voltage of the first busbar capacitor. The second power unit includes a second busbar capacitor, a second auxiliary supply, and a second control module. The second control module is electrically connected to the first communication module. The second auxiliary supply and the second control module are both electrically connected to two ends of the second busbar capacitor. The second busbar capacitor is connected in series to the first busbar capacitor. The second control module is electrically connected to the second auxiliary supply. The second control module is configured to detect a voltage of the second busbar capacitor. The first communication module is configured to output fault information to the second control module when the first control module detects that the voltage of the first busbar capacitor meets a preset condition, for example, the voltage is greater than or equal to a first threshold. The second control module is configured to close the second auxiliary supply when receiving the fault information.

In this embodiment of this application, a first detection circuit in the first power unit detects the voltage of the first busbar capacitor. Therefore, when detecting that the voltage of the first busbar capacitor is greater than or equal to the preset threshold, the first control module in the first power unit may output the fault information to the second control module in the second power unit by using the first communication module. Based on this design, the second control module may close the auxiliary supply in the second power unit based on the received fault information. In this way, not only the voltage of the busbar capacitor in the faulty power unit can be controlled within the safe voltage range, but also the fault can be prevented from being further spread to another normal power unit, thereby improving reliability of the system of the solid-state transformer.

In a possible design, the first control module is configured to close the first auxiliary supply after the first communication module sends the fault information to the second control module. Based on this design, when the power unit is faulty, not only the fault information can be sent to another normally operating power unit, but also the auxiliary supply in the power unit can be closed, to avoid further fault spreading.

In a possible design, the first control module includes a first detection circuit, and the second control module includes a second detection circuit. The first detection circuit is electrically connected to the two ends of the first busbar capacitor to detect the voltage of the first busbar capacitor. The second detection circuit is electrically connected to the two ends of the second busbar capacitor to detect the voltage of the second busbar capacitor. Based on this design, whether the first power unit and the second power unit are faulty may be determined through detection performed by the first detection circuit and the second detection circuit.

In a possible design, the first control module further includes a first control circuit, and the second control module further includes a second control circuit. The first control circuit is electrically connected to the first communication module. The second control circuit is electrically connected to the first communication module. The first control circuit is configured to transmit the fault information to the second control circuit by using the first communication module when the voltage that is of the first busbar capacitor and that is detected by the first detection circuit is greater than or equal to a first threshold. The first control circuit controls a status of the first auxiliary supply based on the voltage of the first busbar capacitor. The second detection circuit transmits the detected voltage of the second busbar capacitor to the second control circuit. The second control circuit is configured to close the second auxiliary supply when receiving the fault information. Based on this design, when the first power unit is faulty, the second power unit may receive the fault information in time, and may close the auxiliary supply in the second power unit in time.

In a possible design, the first control module further includes a first latch circuit. The first latch circuit is electrically connected between the first control circuit and the first auxiliary supply. The first control circuit is configured to output a first signal to the first latch circuit after the first communication module sends the fault information to the second control circuit. The first latch circuit is configured to close the first auxiliary supply based on the first signal. Based on the design of the first latch circuit, the first auxiliary supply may be closed.

In a possible design, the second control module further includes a second latch circuit. The second latch circuit is electrically connected between the second control circuit and the second auxiliary supply. The second control circuit is configured to output a second signal to the second latch circuit after receiving the fault information. The second latch circuit is configured to close the second auxiliary supply based on the second signal. Based on the design of the second latch circuit, the second auxiliary supply may be closed.

According to a second aspect, an embodiment of this application further provides a fault handling system of a solid-state transformer. The fault handling system of the solid-state transformer includes a first power unit and a second power unit that are cascaded and connected. The first power unit includes a first busbar capacitor and a first auxiliary supply. The first auxiliary supply and the first control module are both electrically connected to two ends of the first busbar capacitor. The first control module is electrically connected to the first auxiliary supply. The first control module includes a first detection circuit. The first detection circuit is electrically connected to the two ends of the first busbar capacitor. The first detection circuit is configured to detect a voltage of the first busbar capacitor. The second power unit includes a second busbar capacitor and a second auxiliary supply. The second auxiliary supply is electrically connected to two ends of the second busbar capacitor. The second busbar capacitor is connected in series to the first busbar capacitor. The first control module is configured to close the first auxiliary supply when the first detection circuit detects that the voltage of the first busbar capacitor is less than or equal to a second threshold.

In this embodiment of this application, the first power unit and the second power unit are cascaded and connected. The first busbar capacitor is connected in series to the second busbar capacitor. A total voltage of the first busbar capacitor and the second busbar capacitor remains unchanged. Therefore, if the first power unit is abnormal, the voltage of the second busbar capacitor decreases when the voltage of the first busbar capacitor increases. Based on this design, the first control module may close the first auxiliary supply when the first detection circuit detects that the voltage of the first busbar capacitor is less than a preset threshold. In this embodiment of this application, each power unit may detect by using a detection circuit of each power unit whether a voltage of a busbar capacitor decreases, and may close an auxiliary supply when it is detected that the voltage of the busbar capacitor decreases to a threshold. Therefore, when any cascaded power unit is faulty, a normally operating power unit can close an auxiliary supply in the normally operating power unit and reduce a voltage of a busbar capacitor in the faulty power unit, to ensure that the voltage of the busbar capacitor in the faulty unit is within a safe range, thereby avoiding further fault spreading.

In a possible design, the second control module includes a second detection circuit. The second detection circuit is electrically connected to the two ends of the second busbar capacitor. The second detection circuit is configured to detect the voltage of the second busbar capacitor. Based on this design, in this embodiment of this application, the first detection circuit may be used to determine whether the first power unit is faulty.

In a possible design, the first control module further includes a first control circuit, and the second control module further includes a second control circuit. The first detection circuit is further configured to transmit the detected voltage of the first busbar capacitor to the first control circuit. The first control circuit is configured to control a status of the first auxiliary supply based on the voltage of the first busbar capacitor. The second detection circuit is further configured to transmit the detected voltage of the second busbar capacitor to the second control circuit. The second control circuit is configured to control a status of the second auxiliary supply based on the voltage of the second busbar capacitor. Based on this design, in this embodiment of this application, the statuses of the first auxiliary supply and the second auxiliary supply may be correspondingly controlled by using the first control circuit and the second control circuit.

In a possible design, the first control module further includes a first latch circuit. The first latch circuit is electrically connected between the first control circuit and the first auxiliary supply. The first control circuit is configured to output a first signal to the first latch circuit when the first detection circuit detects that the voltage of the first busbar capacitor is less than a preset threshold. The first latch circuit is configured to close the first auxiliary supply based on the first signal. Based on the design of the first latch circuit, the first auxiliary supply may be closed.

In a possible design, the second control module further includes a second latch circuit. The second latch circuit is electrically connected between the second control circuit and the second auxiliary supply. The second control circuit is configured to output a second signal to the second latch circuit when the second detection circuit detects that the voltage of the second busbar capacitor is less than or equal to a second threshold. The second latch circuit is configured to close the second auxiliary supply based on the second signal. Based on the design of the second latch circuit, the second auxiliary supply may be closed.

In a possible design, the first power unit further includes a first voltage equalization module, and the second power unit further includes a second voltage equalization module. The first voltage equalization module is connected in series to the second voltage equalization module. The first voltage equalization module is connected in parallel to the two ends of the first busbar capacitor. The second voltage equalization module is connected in parallel to the two ends of the second busbar capacitor. If the voltage of the first busbar capacitor is less than or equal to the second threshold and the first auxiliary supply and the second auxiliary supply are both in a closed state, the first voltage equalization module and the second voltage equalization module equalize the voltages of the first busbar capacitor and the second busbar capacitor. Based on this design, in this embodiment of this application, voltage equalization may be performed on all busbar capacitors by using the first voltage equalization module and the second voltage equalization module, to equalize the voltages of the first busbar capacitor and the second busbar capacitor.

Embodiments of this application provide the fault handling system of the solid-state transformer. When any cascaded power unit is faulty, a normally operating power unit can close an auxiliary supply in the normally operating power unit and reduce a voltage of a busbar capacitor in the faulty power unit, to ensure that the voltage of the busbar capacitor in the faulty unit is within a safe range, thereby avoiding further fault spreading, improving reliability of the system, and reducing a volume and the costs of the product.

DESCRIPTION OF EMBODIMENTS

It should be noted that when an element is described as "connected to" another element, the element may be directly connected to the another element, or a mediate element may simultaneously exist. When an element is considered as "disposed in" another element, the element may be directly disposed in the another element, or a mediate element may simultaneously exist.

Unless defined otherwise, all technical and scientific terms used in this specification have the same meaning commonly understood by a person skilled in the art to which this application belongs. The terms used in the description of this application in this specification are merely for the purpose of describing specific embodiments, and are not intended to limit this application. The term "and/or" used in this specification includes any and all combinations of one or more of the related listed items.

Figure 1:
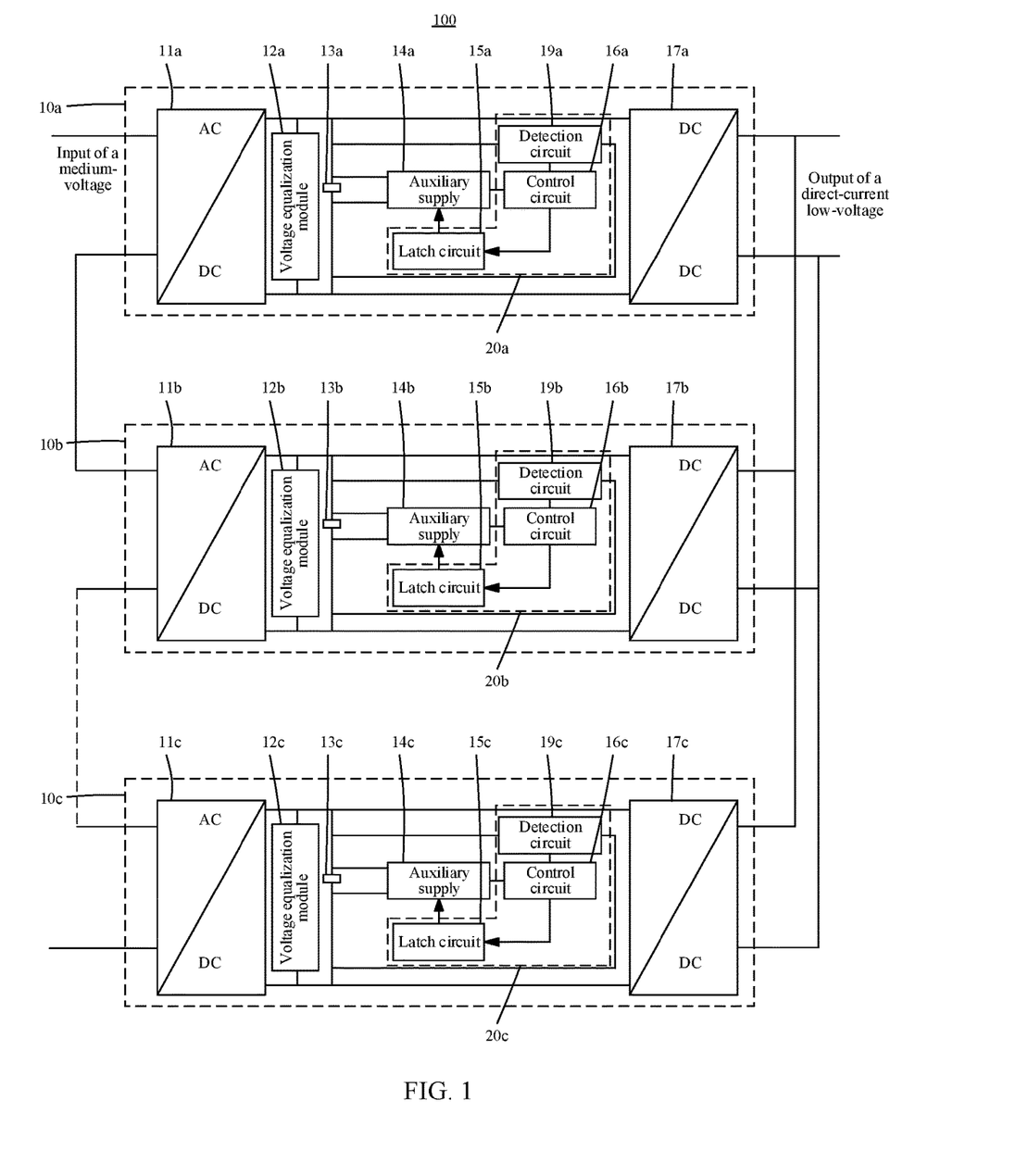
FIG. 1 is a schematic diagram of a fault handling system of a solid-state transformer, according to an embodiment of this application.

FIG. 1 is a schematic diagram of cascading system architecture of a fault handling system 100 of a solid-state transformer according to an embodiment of this application.

The fault handling system 100 of the solid-state transformer in this embodiment of this application may include a plurality of power units (FIG. 1 is described by using an example of only three power units 10a, 10b, and 10c, and a quantity of power units may be more than three or less than three). The power units 10a, 10b, and 10c may be all configured to convert an alternating-current voltage (for example, an alternating-current medium voltage) into a direct-current low voltage or an alternating-current low voltage. In some scenarios, the medium voltage may be 6 kV-12 kV, and the low voltage may be 100 V-800 V. The plurality of power units are cascaded to form the fault handling system 100 of the solid-state transformer. In an embodiment, the fault handling system 100 of the solid-state transformer may be formed after the power unit 10a, the power unit 10b, and the power unit 10c are cascaded. It may be understood that a cascading connection between the power units 10a, 10b, and 10c may be a series connection between input ends of the power units 10a, 10b, and 10c, and a parallel connection between output ends of the power units 10a, 10b, and 10c.

It may be understood that, in this embodiment of this application, a first alternating-current input end after the plurality of power units 10a, 10b, and 10c are cascaded may be connected to a first end of a medium-voltage alternating-current power grid, and a second alternating-current input end after the plurality of power units 10a, 10b, and 10c are cascaded may be connected to a second end of the medium-voltage alternating-current power grid. After direct-current output sides of the power units 10a, 10b, and 10c are connected in parallel to form a direct-current output port, the direct-current output port is connected to a low-voltage direct-current power grid or a load.

For example, the power unit 10a may include an AC-DC converter 11a, a voltage equalization module 12a, a busbar capacitor 13a, an auxiliary supply 14a, a DC-DC converter 17a, and a control module 20a. It may be understood that the control module 20a may include a latch circuit 15a, a control circuit 16a, and a detection circuit 19a. The auxiliary supply 14a may be configured to supply power to the control module 20a in the power unit 10a. For example, the auxiliary supply 14a may supply power to the latch circuit 15a, the control circuit 16a, and the detection circuit 19a. An input-end positive electrode of the AC-DC converter 11a is electrically connected to the first end of the medium-voltage alternating-current power grid. An input-end negative electrode of the AC-DC converter 11a is electrically connected to an input-end positive electrode of the power unit 10b. Two ends of the busbar capacitor 13a are respectively electrically connected to two output ends of the AC-DC converter 11a. The busbar capacitor 13a is connected in parallel to the voltage equalization module 12a. The auxiliary supply 14a is electrically connected to the two ends of the busbar capacitor 13a. The latch circuit 15a is electrically connected to the auxiliary supply 14a and the control circuit 16a. The control circuit 16a is electrically connected to the auxiliary supply 14a. Two input ends of the DC-DC converter 17a are respectively electrically connected to two input ends of the AC-DC converter 11a. Two ends of the detection circuit 19a are respectively electrically connected to the two ends of the busbar capacitor 13a. It may be understood that, in a possible implementation, the auxiliary supply 14a may be a medium-voltage auxiliary supply.

It may be understood that the power unit 10b may include an AC-DC converter 11b, a voltage equalization module 12b, a busbar capacitor 13b, an auxiliary supply 14b, a DC-DC converter 17b, and a control module 20b. The control module 20b may include a latch circuit 15b, a control circuit 16b, and a detection circuit 19b. The auxiliary supply 14b may be configured to supply power to the control module 20b in the power unit 10b. For example, the auxiliary supply 14b may supply power to the latch circuit 15b, the control circuit 16b, and the detection circuit 19b. An alternating-current input end of the AC-DC converter 11b is electrically connected to the input-end negative electrode of the AC-DC converter 11a. An input-end negative electrode of the AC-DC converter 11b is electrically connected to an input-end positive electrode of the power unit 10c. Two ends of the busbar capacitor 13b are respectively electrically connected to two output ends of the AC-DC converter 11b. The busbar capacitor 13b is connected in parallel to the voltage equalization module 12b. The auxiliary supply 14b is electrically connected to the two ends of the busbar capacitor 13b. The latch circuit 15b is electrically connected to the auxiliary supply 14b and the control circuit 16b. The control circuit 16b is electrically connected to the auxiliary supply 14b. Two input ends of the DC-DC converter 17b are respectively electrically connected to two input ends of the AC-DC converter 11*b*. Two ends of the detection circuit 19*b* are respectively electrically connected to the two ends of the busbar capacitor 13*b*. It may be understood that, in a possible implementation, the auxiliary supply 14*b* may be a medium-voltage auxiliary supply.

The power unit 10*c* may include an AC-DC converter 11*c*, a voltage equalization module 12*c*, a busbar capacitor 13*c*, an auxiliary supply 14*c*, a DC-DC converter 17*c*, and a control module 20*c*. The control module 20*c* may include a latch circuit 15*c*, a control circuit 16*c*, and a detection circuit 19*c*. The auxiliary supply 14*c* may be configured to supply power to the control module 20*c* in the power unit 10*c*. For example, the auxiliary supply 14*c* may supply power to the latch circuit 15*c*, the control circuit 16*c*, and the detection circuit 19*c*. An input-end positive electrode of the AC-DC converter 11*c* is electrically connected to the input-end negative electrode of the AC-DC converter 11*b*. An input-end negative electrode of the AC-DC converter 11*c* is electrically connected to the second end of the medium-voltage alternating-current power grid. Two ends of the busbar capacitor 13*c* are respectively electrically connected to two output ends of the AC-DC converter 11*c*. The busbar capacitor 13*c* is connected in parallel to the voltage equalization module 12*c*. The auxiliary supply 14*c* is electrically connected to the two ends of the busbar capacitor 13*c*. The latch circuit 15*c* is electrically connected to the auxiliary supply 14*c* and the control circuit 16*c*. The control circuit 16*c* is electrically connected to the auxiliary supply 14*c*. Two input ends of the DC-DC converter 17*c* are respectively electrically connected to two input ends of the AC-DC converter 11*c*. It may be understood that, in a possible implementation, the auxiliary supply 14*c* may be a medium-voltage auxiliary supply.

It may be understood that, because the power unit 10*a*, the power unit 10*b*, and the power unit 10*c* are cascaded and connected, that is, input ends of the power units 10*a*, 10*b*, and 10*c* are connected in series, output ends of the power units 10*a*, 10*b*, and 10*c* are connected in parallel. Based on this design, the busbar capacitor 13*a*, the busbar capacitor 13*b*, and the busbar capacitor 13*c* are connected in series.

In this embodiment, a direct-current output port is formed after a direct-current output side of the DC-DC converter 17*a*, a direct-current output side of the DC-DC converter 17*b*, and a direct-current output side of the DC-DC converter 17*c* are connected in parallel or in series. The direct-current output port is connected to the low-voltage direct-current power grid, an inverter, or a load.

If any auxiliary supply or an MCU in the fault handling system 100 of the solid-state transformer is faulty, a latch circuit in another normally operating power unit may close a corresponding auxiliary supply. Specifically, the normally operating latch circuit may close the auxiliary supply obtaining power from a busbar. Unless the busbar is powered on again after power failure, the auxiliary supply cannot be enabled again.

For example, the auxiliary supply 14*a* in the power unit 10*a* is faulty and the auxiliary supply 14*b* and the auxiliary supply 14*c* are both normal, and an output end of the auxiliary supply 14*a* cannot output a voltage to the control circuit 16*a*. In this case, the control circuit 16*a* is in a non-operating state, and a voltage of the busbar capacitor 13*a* increases. The busbar capacitor 13*a* is connected in series to the busbar capacitor 13*b*. A total voltage of all busbar capacitors connected in series remains unchanged. Therefore, when a voltage of the busbar capacitor 13*a* increases, the detection circuit 19*b* may detect a voltage drop of the busbar capacitor 13*b*, and transmit a detected voltage signal to the control circuit 16*b*. When a voltage of the busbar capacitor 13*b* is less than or equal to a second threshold, the control circuit 16*b* may determine that one of cascaded power units is faulty. The control circuit 16*b* outputs a control signal to the latch circuit 15*b*, and the latch circuit 15*b* closes the auxiliary supply 14*b*. It may be understood that the detection circuit 19*c* detects a voltage drop of the busbar capacitor 13*c*, and transmits a detected voltage signal to the control circuit 16*c*. When a voltage of the busbar capacitor 13*c* is less than or equal to the second threshold, the control circuit 16*c* may determine that one of the cascaded power units is faulty. The control circuit 16*c* outputs a control signal to the latch circuit 15*c*. The latch circuit 15*c* may close the auxiliary supply 14*c*. Because the auxiliary supply 14*b* and the auxiliary supply 14*c* are both in a closed state, that is, the auxiliary supply 14*b* and the auxiliary supply 14*c* do not operate, the voltage of the busbar capacitor 13*b* and the voltage of the busbar capacitor 13*c* both increase, to reduce the voltage of the busbar capacitor 13*a* and avoid an electrolyte overflow caused due to the excessively high voltage of the busbar capacitor 13*a*. In addition, the voltage equalization module 12*b* and the voltage equalization module 12*c* may respectively perform voltage equalization on the voltage of the busbar capacitor 13*b* and the voltage of the busbar capacitor 13*c*, to equalize the voltage of the busbar capacitor 13*b* and the voltage of the busbar capacitor 13*c*.

The auxiliary supply 14*a* in the power unit 10*a* is faulty and the auxiliary supply 14*b* and the auxiliary supply 14*c* are both normal, and the output end of the auxiliary supply 14*a* can output a voltage to the control circuit 16*a*. In this case, the voltage of the busbar capacitor 13*a* increases. The control circuit 16*a* is in an operating state, and outputs a control signal to the latch circuit 15*a*, to control the latch circuit 15*a* to close the auxiliary supply 14*a*. In this case, the detection circuit 19*b* and the detection circuit 19*c* respectively detect a voltage change of the busbar capacitor 13*b* and a voltage change of the busbar capacitor 13*c*. The control circuit 16*b* and the control circuit 16*c* respectively output control signals to the latch circuit 15*b* and the latch circuit 15*c*. The latch circuit 15*b* and the latch circuit 15*c* may respectively close the auxiliary supply 14*b* and the auxiliary supply 14*c*. The auxiliary supply 14*a*, the auxiliary supply 14*b*, and the auxiliary supply 14*c* are all in the closed state. Therefore, in this case, the voltages of the busbar capacitors in all the power units connected in series are imposed only on the voltage equalization modules. The voltage equalization modules re-allocate and equalize the voltages of the busbar capacitors in all the power units connected in series, to reduce the voltage of the busbar capacitor in the faulty power unit.

Based on this design, it can be ensured that the voltage of the busbar capacitor in the faulty power unit is within a safe range. For example, that the busbar capacitor 13*a* is connected in parallel to the voltage equalization module 12*a* may be that voltage equalization is automatically performed by using a passive component on the voltages of the busbar capacitors connected in series. When a voltage of one of the capacitors connected in series increases, a current consumed on a resistor connected in parallel to the capacitor increases, to reduce the voltage of the capacitor. In this way, the voltages of the capacitors connected in series are in a voltage-equalized state, to avoid out-of-control due to over-voltage caused by the positive feedback.

In this embodiment, a non-faulty power unit may detect a voltage waveform of a busbar capacitor in the non-faulty power unit. The voltage waveform is inconsistent with a normal voltage equalization waveform. Therefore, when the voltage waveform keeps falling, the control module may send a control indication to the latch circuit, to close the auxiliary supply.

Figure 2:
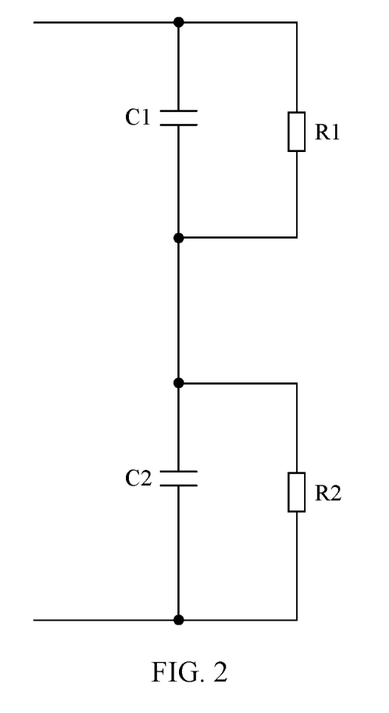
FIG. 2 is a schematic diagram of a voltage equalization module, according to an embodiment of this application.

FIG. 2 is a diagram of a circuit structure of a voltage equalization module according to an embodiment of this application.

It may be understood that a structure of the voltage equalization module 12a is fully the same as those of the voltage equalization module 12b and the voltage equalization module 12c. In this embodiment, the voltage equalization module 12a is used as an example. The voltage equalization module 12a may include a capacitor C1, a capacitor C2, a resistor R1, and a resistor R2.

In this embodiment, a first end of the capacitor C1 is electrically connected to the first end of the busbar capacitor 13a, a second end of the capacitor C1 is electrically connected to a first end of the capacitor C2, and a second end of the capacitor C2 is electrically connected to the second end of the busbar capacitor 13a. A first end of the resistor R1 is electrically connected to the first end of the capacitor C1, a second end of the resistor R1 is electrically connected to the second end of the capacitor C1, a first end of the resistor R2 is electrically connected to a first end of the capacitor C2, and a second end of the resistor R2 is electrically connected to a second end of the capacitor C2.

Figure 3:
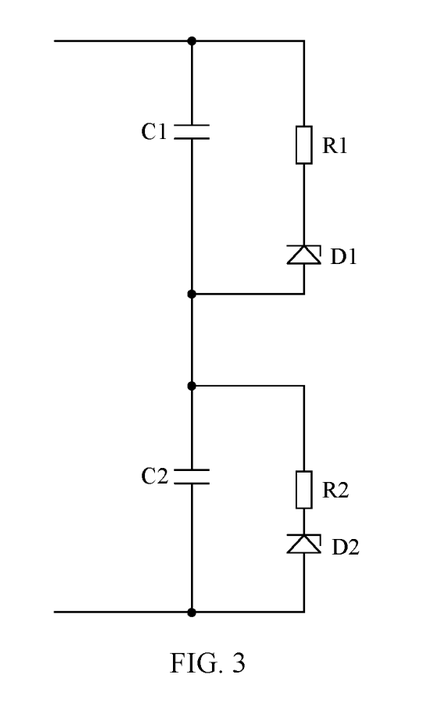
FIG. 3 is another schematic diagram of a voltage equalization module, according to an embodiment of this application.

FIG. 3 is a diagram of a circuit structure of a voltage equalization module according to another embodiment of this application.

A difference between the voltage equalization module in this embodiment and the voltage equalization module shown in FIG. 2 is that, as shown in FIG. 3, in this embodiment, the voltage equalization module (for example, the voltage equalization module 12a) may further include a Zener diode D1 and a Zener diode D2.

In this embodiment, a first end of the capacitor C1 is electrically connected to the first end of the busbar capacitor 13a, a second end of the capacitor C1 is electrically connected to a first end of the capacitor C2, and a second end of the capacitor C2 is electrically connected to the second end of the busbar capacitor 13a. A first end of the resistor R1 is electrically connected to the first end of the capacitor C1, a second end of the resistor R1 is electrically connected to a cathode of the Zener diode D1, and an anode of the Zener diode D2 is electrically connected to the second end of the capacitor C1. A first end of the resistor R2 is electrically connected to the first end of the capacitor C2, a second end of the resistor R2 is electrically connected to a cathode of the Zener diode D2, and an anode of the Zener diode D2 is electrically connected to the second end of the capacitor C2.

Figure 4:
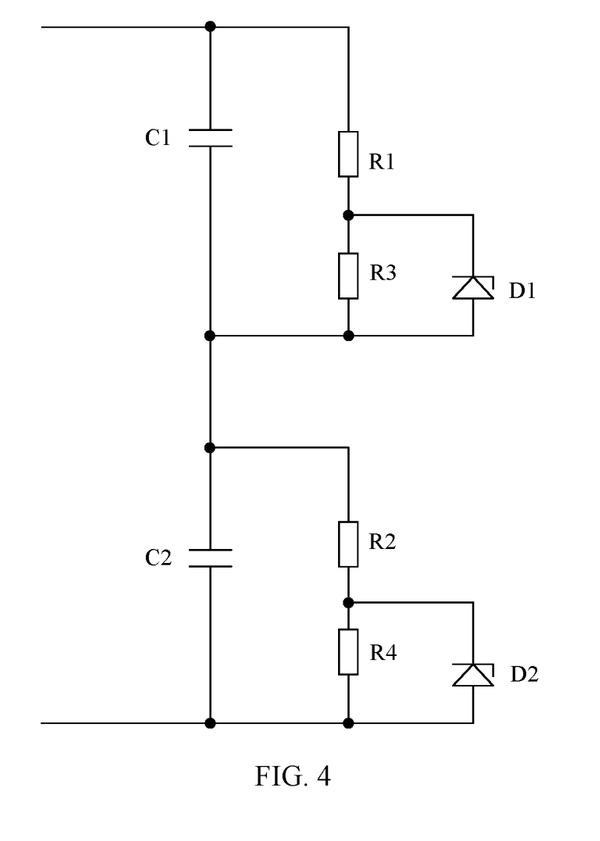
FIG. 4 is another schematic diagram of a voltage equalization module, according to an embodiment of this application.

FIG. 4 is a diagram of a circuit structure of a voltage equalization module according to another embodiment of this application.

A difference between the voltage equalization module in this embodiment and the voltage equalization module shown in FIG. 2 is that, as shown in FIG. 4, in this embodiment, the voltage equalization module (for example, the voltage equalization module 12a) may further include a Zener diode D1, a Zener diode D2, a resistor R3, and a resistor R4.

In this embodiment, a first end of the capacitor C1 is electrically connected to the first end of the busbar capacitor 13a, a second end of the capacitor C1 is electrically connected to a first end of the capacitor C2, and a second end of the capacitor C2 is electrically connected to the second end of the busbar capacitor 13a.

A first end of the resistor R1 is electrically connected to the first end of the capacitor C1, a second end of the resistor R1 is electrically connected to a first end of the resistor R3, a second end of the resistor R3 is electrically connected to the second end of the capacitor C1, a cathode of the Zener diode D1 is electrically connected to a node between the second end of the resistor R1 and the first end of the resistor R3, and an anode of the Zener diode D1 is electrically connected to the second end of the capacitor C1. A first end of the resistor R2 is electrically connected to the first end of the capacitor C2, a second end of the resistor R2 is electrically connected to a first end of the resistor R4, a second end of the resistor R4 is electrically connected to the second end of the capacitor C2, a cathode of the Zener diode D2 is electrically connected to a node between the second end of the resistor R2 and the first end of the resistor R4, and an anode of the Zener diode D2 is electrically connected to the second end of the capacitor C2.

Figure 5:
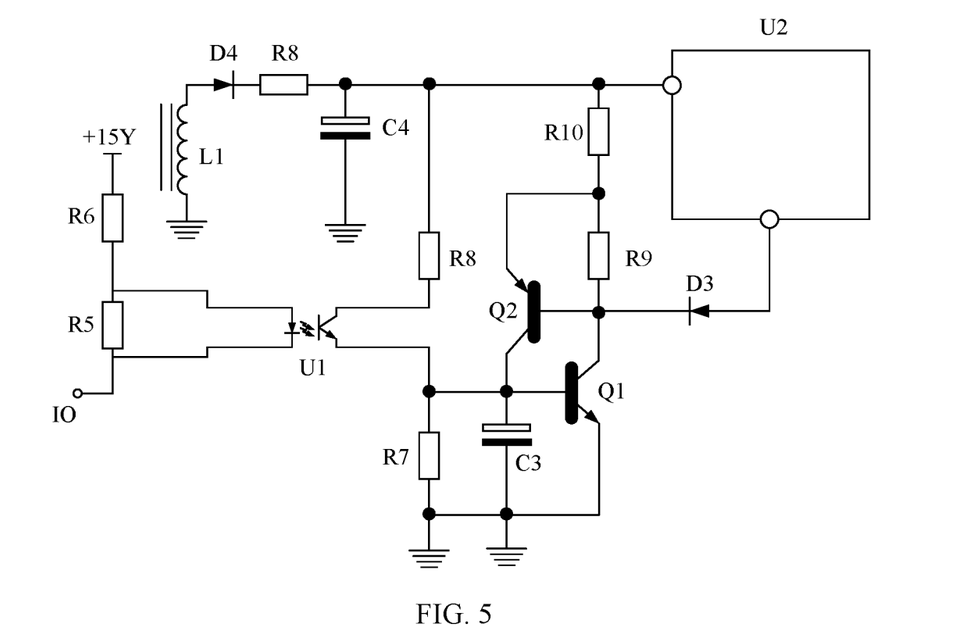
FIG. 5 is a schematic diagram of a latch circuit, according to an embodiment of this application.

FIG. 5 is a diagram of a circuit structure of a latch circuit according to an embodiment of this application.

It may be understood that a structure of the latch circuit 15a is fully the same as those of the latch circuit 15b and the latch circuit 15c. In this embodiment, the latch circuit 15a is used as an example for description. The latch circuit 15a may include an opto-isolator U1, a processing chip U2, transistors Q1-Q2, diodes D3-D4, capacitors C3-C4, an inductor L1, and resistors R5-R11.

The opto-isolator U1 may include a light-emitting unit and a switch unit. The switch unit includes an emitter and a collector. A cathode of the light-emitting unit is electrically connected to a node between a control pin 10 of the control circuit 16a and a first end of the resistor R5, an anode of the light-emitting unit is electrically connected to a node between a second end of the resistor R5 and a first end of the resistor R6, and a second end of the resistor R6 is electrically connected to a first power supply +15 V. An emitter of the switch unit is grounded by using the resistor R7, and a collector of the switch unit is electrically connected to a first signal pin of the processing chip U2 by using the resistor R8.

A base of the transistor Q1 is electrically connected to a collector of the transistor Q2 and an emitter of the switch unit, an emitter of the transistor Q1 is grounded, and a collector of the transistor Q1 is electrically connected to the first signal pin of the processing chip U2 sequentially through the resistor R9 and the resistor R10. A base of the transistor Q2 is electrically connected to a node between the collector of the transistor Q1 and the resistor R9, a collector of the transistor Q2 is grounded by using a capacitor C3, an emitter of the transistor Q2 is electrically connected to a node between the resistor R9 and the resistor R10, a cathode of the diode D3 is electrically connected to a node between the collector of the transistor Q1 and the resistor R9, and an anode of the diode D3 is electrically connected to a second signal pin of the processing chip U2. A first end of the resistor R11 is electrically connected to the first signal pin of the processing chip U2, the first end of the resistor R11 is further grounded by using the capacitor C4, a second end of the resistor R11 is electrically connected to a cathode of the diode D4, and an anode of the diode D4 is grounded by using the inductor L1.

It may be understood that the control pin IO of the control circuit 16a sends a signal to the opto-isolator U1. When a signal output by the control pin IO is a low-level signal, the opto-isolator U1 is on to control the transistor Q1 to be on. After the transistor Q1 is on, the base of the transistor Q2 is pulled down to a low level state, and the second signal pin of the processing chip U2 is also pulled down to the low level state. In this case, the processing chip U2 does not send a control signal, and the auxiliary supply 14a has no output.

In addition, the transistor Q1 is on, and the transistor Q1 and the transistor Q2 may form an interlock circuit. When a busbar voltage exists, the transistor Q1 and the transistor Q2 are constantly in an on state, and the processing chip U2 cannot reach a power-on voltage of the processing chip U2. Therefore, only when the busbar voltage disappears and fully discharges, the transistor Q1 and the transistor Q2 are no longer on, and the processing chip U2 can reach the power-on voltage of the processing chip U2 and start to operate normally.

In this embodiment, the control module may detect a voltage waveform of the busbar capacitor by using the detection circuit. For example, the control circuit 16a may detect the voltage waveform of the busbar capacitor 13a by using the detection circuit 19a, determine whether the voltage waveform is normal, and send a corresponding control signal to the latch circuit 15a. It may be understood that, in some possible embodiments, the control module may be formed by a micro control unit (Micro Control Unit, MCU) and a peripheral circuit of the micro control unit, or may be formed by a peripheral circuit of another data processing control chip such as digital signal processing (digital signal processing, DSP) or an advanced RISC machine (Advanced RISC Machines, ARM).

Figure 6:
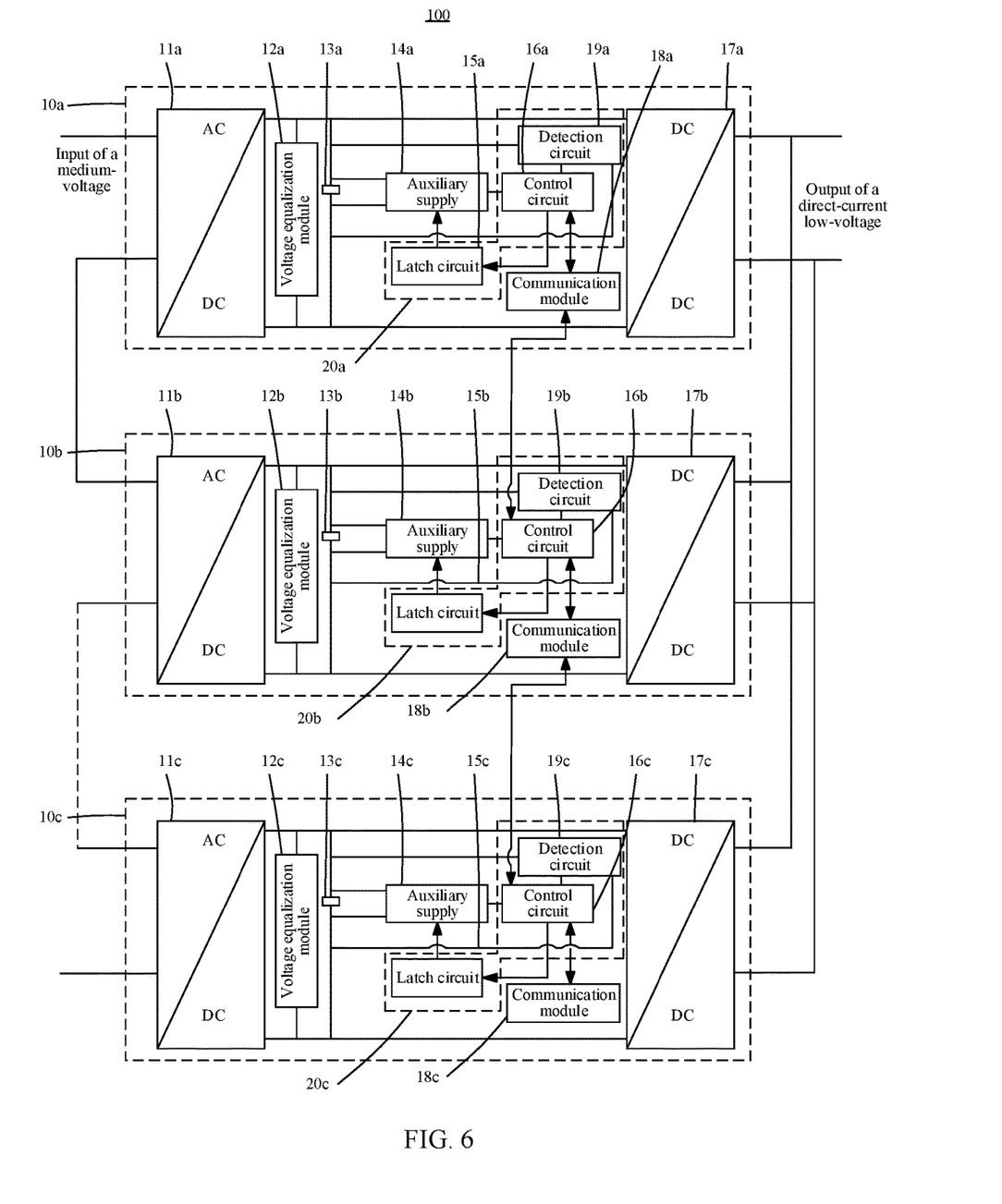
FIG. 6 is another schematic diagram of a fault handling system of a solid-state transformer, according to an embodiment of this application.

FIG. 6 is a schematic diagram of another embodiment of a fault handling system 100 of a solid-state transformer according to this application.

A difference between the fault handling system 100 of the solid-state transformer in this embodiment and the fault handling system 100 of the solid-state transformer shown in FIG. 1 is that, as shown in FIG. 6, each power unit in this embodiment may further include a communication module, and the communication module establishes a communication connection to the control module.

For example, the power unit 10a may further include a communication module 18a, the power unit 10b may further include a communication module 18b, and the power unit 10c may further include a communication module 18c. The communication module 18a is connected to the control circuit 16a and the communication module 18b in a communication manner, the communication module 18b is connected to the control circuit 16b and the communication module 18c in a communication manner, and the communication module 18c is connected to the control circuit 16c in a communication manner. For example, an operation parameter of the power unit 10a may be transmitted to the control circuit in the power unit 10b by using the communication module 18a. An operation parameter of the power unit 10b may be transmitted to the control circuit in the power unit 10a by using the communication module 18a. It may be understood that an auxiliary supply in each power unit may be configured to supply power to a corresponding communication module. For example, the auxiliary supply 14a may be configured to supply power to the communication module 18a, the auxiliary supply 14b may be configured to supply power to the communication module 18b, and the auxiliary supply 14c may be configured to supply power to the communication module 18c.

Based on this design, signals are transmitted between the power unit 10a, the power unit 10b, and the power unit 10c by using the communication module 18a, the communication module 18b, and the communication module 18c. When the power units in the fault handling system 100 of the solid-state transformer operate normally, all the power units may communicate with each other to transmit information indicating that a busbar voltage is normal.

When a power unit is faulty, another normally operating power unit may receive fault information. The faulty power unit closes an auxiliary supply in the faulty power unit, and transmits the fault information to an adjacent power unit, to close auxiliary supplies of all normally operating power units.

For example, when the power unit 10a, the power unit 10b, and the power unit 10c operate normally, communication is performed between the power unit 10a, the power unit 10b, and the power unit 10c, to mutually transmit information indicating that the voltage of the busbar capacitor is normal. When one of the power unit 10a, the power unit 10b, and the power unit 10c is faulty, for example, when the power unit 10a is faulty, that is, the power unit 10a detects by using the detection circuit 19a that the voltage of the busbar capacitor 13a is greater than or equal to a first threshold, the communication module 18a in the power unit 10a may send the fault information to the control module 20b in the power unit 10b. For example, the communication module 18a may send the fault information to the control circuit 16b, and then the control circuit 16a in the power unit 10a outputs a control signal to the latch circuit 15a, so that the latch circuit 15a can close the auxiliary supply 14a. When the control circuit 16b in the power unit 10b receives the fault information, the control circuit 16b may further output a control signal to the latch circuit 15b after the fault information of the power unit 10a is transmitted to the control circuit 16c in the power unit 10c, and the latch circuit 15b may close the auxiliary supply 14b. After receiving the fault information of the power unit 10a, the control circuit 16c in the power unit 10c may transmit the fault information of the power unit 10a to a next-level power unit. The control circuit 16c further outputs a control signal to the latch circuit 15c, and the latch circuit 15c may close the auxiliary supply 14c.

Embodiments of this application provide the fault handling system 100 of the solid-state transformer. When any cascaded power unit is faulty, a normally operating power unit can close an auxiliary supply in the normally operating power unit and reduce a voltage of a busbar capacitor in the faulty power unit, to ensure that the voltage of the busbar capacitor in the faulty unit is within a safe range, thereby avoiding further fault spreading, improving reliability of the system, and reducing a volume and the costs of the product. A person of ordinary skill in the art should understand that the foregoing implementations are merely intended to describe this application but are not intended to limit this application, provided that proper modifications and changes made to the foregoing embodiments in the essential scope of this application fall within the protection scope of this application.

What is claimed is:

1. A fault handling system of a solid-state transformer, comprising a first power unit and a second power unit that are cascaded and connected, wherein:
the first power unit comprises a first busbar capacitor, a first auxiliary supply, a first control module, and a first communication module, wherein the first communication module is electrically connected to the first control module, the first auxiliary supply and the first control module are both electrically connected to two ends of the first busbar capacitor, the first control module is electrically connected to the first auxiliary supply, and the first control module is configured to detect a voltage of the first busbar capacitor;
the second power unit comprises a second busbar capacitor, a second auxiliary supply, and a second control module, wherein the second control module is electrically connected to the first communication module, the second auxiliary supply and the second control module are both electrically connected to two ends of the second busbar capacitor, the second busbar capacitor is connected in series to the first busbar capacitor, the second control module is electrically connected to the second auxiliary supply, and the second control module is configured to detect a voltage of the second busbar capacitor; and the first communication module is configured to output fault information to the second control module in response to the first control module detecting that the voltage of the first busbar capacitor is greater than or equal to a first threshold and the second control module is configured to close the second auxiliary supply in response to receiving the fault information.

2. The fault handling system of a solid-state transformer according to claim 1, wherein:
the first control module is further configured to close the first auxiliary supply after the first communication module sends the fault information to the second control module.

3. The fault handling system of a solid-state transformer according to claim 1, wherein:
the first control module comprises a first detection circuit, the second control module comprises a second detection circuit, wherein the first detection circuit is electrically connected to the two ends of the first busbar capacitor to detect the voltage of the first busbar capacitor and the second detection circuit is electrically connected to the two ends of the second busbar capacitor to detect the voltage of the second busbar capacitor.

4. The fault handling system of a solid-state transformer according to claim 2, wherein:
the first control module comprises a first detection circuit, the second control module comprises a second detection circuit, wherein the first detection circuit is electrically connected to the two ends of the first busbar capacitor to detect the voltage of the first busbar capacitor and the second detection circuit is electrically connected to the two ends of the second busbar capacitor to detect the voltage of the second busbar capacitor.

5. The fault handling system of a solid-state transformer according to claim 3, wherein:
the first control module further comprises a first control circuit, the second control module further comprises a second control circuit, wherein the first control circuit is electrically connected to the first communication module and the second control circuit is electrically connected to the first communication module;
the first control circuit is configured to transmit the fault information to the second control circuit by using the first communication module in response to the voltage of the first busbar capacitor and detected by the first detection circuit being greater than or equal to the first threshold and the first control circuit controls a status of the first auxiliary supply based on the voltage of the first busbar capacitor; and
the second detection circuit transmits the detected voltage of the second busbar capacitor to the second control circuit and the second control circuit is configured to close the second auxiliary supply in response to receiving the fault information.

6. The fault handling system of a solid-state transformer according to claim 4, wherein:
the first control module further comprises a first control circuit, the second control module further comprises a second control circuit, wherein the first control circuit is electrically connected to the first communication module, and wherein the second control circuit is electrically connected to the first communication module;
the first control circuit is further configured to transmit the fault information to the second control circuit by using the first communication module in response to the voltage of the first busbar capacitor and detected by the first detection circuit being greater than or equal to the first threshold and the first control circuit controls a status of the first auxiliary supply based on the voltage of the first busbar capacitor; and
the second detection circuit transmits the detected voltage of the second busbar capacitor to the second control circuit and the second control circuit is further configured to close the second auxiliary supply in response to receiving the fault information.

7. The fault handling system of a solid-state transformer according to claim 1, wherein:
the first control module further comprises a first latch circuit, wherein the first latch circuit is electrically connected between the first control circuit and the first auxiliary supply, the first control circuit is further configured to output a first signal to the first latch circuit after the first communication module sends the fault information to the second control circuit, and the first latch circuit is configured to close the first auxiliary supply based on the first signal.

8. The fault handling system of a solid-state transformer according to claim 1, wherein:
the second control module further comprises a second latch circuit, wherein the second latch circuit is electrically connected between the second control circuit and the second auxiliary supply, the second control circuit is further configured to output a second signal to the second latch circuit after receiving the fault information, and the second latch circuit is configured to close the second auxiliary supply based on the second signal.

9. A fault handling system of a solid-state transformer, comprising a first power unit and a second power unit that are cascaded and connected, wherein:
the first power unit comprises a first busbar capacitor and a first auxiliary supply, wherein the first auxiliary supply and a first control module are both electrically connected to two ends of the first busbar capacitor, the first control module is electrically connected to the first auxiliary supply, the first control module comprises a first detection circuit, the first detection circuit is electrically connected to the two ends of the first busbar capacitor, and the first detection circuit is configured to detect a voltage of the first busbar capacitor;
the second power unit comprises a second busbar capacitor and a second auxiliary supply, wherein the second auxiliary supply is electrically connected to two ends of the second busbar capacitor and the second busbar capacitor is connected in series to the first busbar capacitor; and
the first control module is configured to close the first auxiliary supply in response to the first detection circuit detecting that the voltage of the first busbar capacitor is less than or equal to a second threshold.

10. The fault handling system of a solid-state transformer according to claim 9, wherein:

the second control module comprises a second detection circuit, wherein the second detection circuit is electrically connected to the two ends of the second busbar capacitor and the second detection circuit is configured to detect a voltage of the second busbar capacitor.

11. The fault handling system of a solid-state transformer according to claim 10, wherein:
the first control module further comprises a first control circuit and the second control module further comprises a second control circuit;
the first detection circuit is further configured to transmit the detected voltage of the first busbar capacitor to the first control circuit and the first control circuit is configured to control a status of the first auxiliary supply based on the voltage of the first busbar capacitor; and
the second detection circuit is further configured to transmit the detected voltage of the second busbar capacitor to the second control circuit and the second control circuit is configured to control a status of the second auxiliary supply based on the voltage of the second busbar capacitor.

12. The fault handling system of a solid-state transformer according to claim 10, wherein:
the first control module further comprises a first latch circuit, wherein the first latch circuit is electrically connected between the first control circuit and the first auxiliary supply, the first control circuit is further configured to output a first signal to the first latch circuit in response to the first detection circuit detecting that the voltage of the first busbar capacitor is less than or equal to the second threshold, and the first latch circuit is configured to close the first auxiliary supply based on the first signal.

13. The fault handling system of a solid-state transformer according to claim 11, wherein:
the first control module further comprises a first latch circuit, wherein the first latch circuit is electrically connected between the first control circuit and the first auxiliary supply, the first control circuit is further configured to output a first signal to the first latch circuit in response to the first detection circuit detecting that the voltage of the first busbar capacitor is less than or equal to the second threshold, and the first latch circuit is configured to close the first auxiliary supply based on the first signal.

14. The fault handling system of a solid-state transformer according to claim 10, wherein:
the second control module further comprises a second latch circuit, wherein the second latch circuit is electrically connected between the second control circuit and the second auxiliary supply, the second control circuit is further configured to output a second signal to the second latch circuit in response to the second detection circuit detecting that the voltage of the second busbar capacitor is less than or equal to the second threshold, and the second latch circuit is configured to close the second auxiliary supply based on the second signal.

15. The fault handling system of a solid-state transformer according to claim 11, wherein:
the second control module further comprises a second latch circuit, wherein the second latch circuit is electrically connected between the second control circuit and the second auxiliary supply, the second control circuit is further configured to output a second signal to the second latch circuit in response to the second detection circuit detecting that the voltage of the second busbar capacitor is less than or equal to the second threshold, and the second latch circuit is configured to close the second auxiliary supply based on the second signal.

16. The fault handling system of a solid-state transformer according to claim 12, wherein:
the second control module further comprises a second latch circuit, wherein the second latch circuit is electrically connected between the second control circuit and the second auxiliary supply, the second control circuit is further configured to output a second signal to the second latch circuit in response to the second detection circuit detecting that the voltage of the second busbar capacitor is less than or equal to the second threshold, and the second latch circuit is configured to close the second auxiliary supply based on the second signal.

17. The fault handling system of a solid-state transformer according to claim 9, wherein:
the first power unit further comprises a first voltage equalization module, the second power unit further comprises a second voltage equalization module, wherein the first voltage equalization module is connected in series to the second voltage equalization module, the first voltage equalization module is connected in parallel to the two ends of the first busbar capacitor, and wherein the second voltage equalization module is connected in parallel to the two ends of the second busbar capacitor; and
in response to the voltage of the first busbar capacitor being less than or equal to a preset threshold and the first auxiliary supply and the second auxiliary supply both being in a closed state, the first voltage equalization module and the second voltage equalization module equalize the voltages of the first busbar capacitor and the second busbar capacitor.

* * * * *